United States Patent [19]

Sakuma

[11] 4,019,263
[45] Apr. 26, 1977

[54] CARD TYPE LANGUAGE TEACHING APPARATUS

[75] Inventor: Roku Sakuma, Tokyo, Japan

[73] Assignee: Ryobi, Ltd., Fuchu, Japan

[22] Filed: Sept. 17, 1975

[21] Appl. No.: 614,177

[52] U.S. Cl. .................................. 35/35 C; 35/8 A; 35/9 R
[51] Int. Cl.² ........................................ G09B 19/04
[58] Field of Search ............ 35/8 A, 9 A, 9 B, 9 R, 35/35 C, 48 R; 360/2, 88, 106, 121

[56] References Cited

UNITED STATES PATENTS

| | | | |
|---|---|---|---|
| 3,348,320 | 11/1967 | Brokan | 35/35 C |
| 3,353,280 | 11/1967 | Emde | 35/9 A |
| 3,369,308 | 2/1968 | Curran | 35/35 C |
| 3,477,140 | 11/1969 | Ryan et al. | 35/35 C |
| 3,488,867 | 1/1970 | Lyon et al. | 35/35 C |
| 3,540,133 | 11/1970 | Davidge et al. | 35/9 A |
| 3,587,180 | 6/1971 | Richt | 35/35 C |
| 3,598,927 | 8/1971 | Becker et al. | 360/106 |
| 3,610,635 | 10/1971 | Schiff et al. | 35/35 C |
| 3,840,896 | 10/1974 | Lorbergs | 35/35 C |
| 3,893,182 | 7/1975 | Schmidt | 360/2 |

*Primary Examiner*—Richard C. Pinkham
*Assistant Examiner*—Vance Y. Hum

[57] ABSTRACT

Herein disclosed is a language teaching apparatus of card type, in which a teaching card having a visual information and at least one magnetically recording band is repeatedly returned in an automatic manner or in accordance with the will of the student so that not only the programmed question but also the basic and student's answers may be repeatedly reproduced for confirmation or comparison. The language teaching apparatus includes as customary a body formed with an upright guide slot, in which the teaching card is allowed to run horizontally back and forth, card drive capstan for operatively driving the card when in contact therewith, magnetic reproduction heads for magnetically reproducing, when in contact with the recording band of the card, a programmed audio question which is recorded in the recording band, mechanical linkage for bringing the card drive capstan into its operative position, electric circuits for actuating the mechanical linkage, and manual control buttons for controlling the electric circuits. The language teaching apparatus is characterized by the provision of two limit switches cooperatively actuatable in response to its engagement with and disengagement from the running card for defining the running range of the card and for controlling the electric circuits together with the manual control buttons, and by the provision of a repeat switch for reversing the direction of movement of the card so that the audio information may be reproduced once more.

16 Claims, 14 Drawing Figures

CARD TYPE LANGUAGE TEACHING APPARATUS

BACKGROUND OF THE INVENTION

1. Field of the Invention

The present invention relates to a language teaching apparatus using a teaching card having a visual and audio study program. The present invention relates in another aspect to a teaching card assembly for use with the language teaching apparatus of the above type.

2. Description of the Prior Art

A language teaching system using a cassette tape or the like has come into wide use. Although many devices are inclusive, such conventional system of a cassette type or the like requires the student to refer to the text book or the guide book while he is following the educational program, thus separating the teaching media. If the student be so mature or such an adult as can accomplish self-study sufficiently or as has sufficient interest for study, he could reach the goal through his own efforts not only by his pronunciation exercises but also by his advances exercises for application even when he uses such conventional system. For pupils of lower grades or infants, however, the conventional system will disturb their concentrations on the educational program and cannot attain its sufficient teaching effects, because the separated teaching media will incur separation of the subject of study. Since, moreover, the manipulation of the system is quite complicated for the repeated practice, the student will not do so positively.

Thus, another language teaching system using a recording card has recently been thought better of, but neither hardware nor software therefor have been developed satisfactorily.

More specifically, although such sheet recorder can incorporate the two teaching media, namely, audio and visual media into a sheet of card, it is not suitable for the repeated practice. Although, moreover, an applied or developed study from the picture or letters in a sheet of the card is desirable for the software, the hardware therefor has not been established yet. Generally speaking, still moreover, the handling of the recorder is also complicated just in the case of the cassette tape recorder.

In the recording card system, on the other hand, since the student will recognize the person in the picture as a third person from his study feeling, the system is not appropriate for the exercises of the conversation between the two parties, namely, "You" and "I", which is considered the most important for learning conversations of foreign languages. Since, moreover, the key word necessary for the applied study is seen in the picture or letters in the sheet from the beginning, the student is disturbed not only in his concentration but also in his interest for the study.

SUMMARY OF THE INVENTION

It is, therefore, an object of the present invention to provide an improved language teaching apparatus which is free from the above drawbacks.

Another object of the present invention is to provide an improved language teaching apparatus which uses a teaching card having both a visual information acting as a main theme of the educational program and at least one magnetically recording band.

Still another object of the present invention is to provide an improved language teaching apparatus, in which the teaching card is moved back and forth for reproducing at least one programmed question concerning the visual information and at least one basic answer corresponding to the question.

A further object of the present invention is to provide an improved language teaching apparatus, in which the forward and backward movement of the teaching card is also carried out for recording and reproducing at least one student's answer to the programmed question.

A further object of the present invention is to provide an improved language teaching apparatus, in which the teaching card additionally has a plurality of image slides concerning the visual information for the projecting purpose.

A further but important object of the present invention is to provide an improved language teaching apparatus, in which the teaching card can be repeatedly returned in an automatic manner or in accordance with the will of the student so that not only the question but also the basic and student's answers may be repeatedly reproduced for confirmation or comparison.

A further but important object of the present invention is to provide an improved teaching card assembly of two sheet construction for use with the above language teaching apparatus.

A further object of the present invention is to provide an improved teaching card assembly of the above type, in which at least one of the two sheets is made of a transparent material to that their key and additional visual informations may be observed as a visual information of a superposed meaning when they are placed one on the other.

BRIEF DESCRIPTION OF THE DRAWINGS

Other objects and advantages of the present invention will become apparent from the following description which is made in connection with the accompanying drawings, in which.

DESCRIPTION OF THE PREFERRED EMBODIMENTS

Figure 1:
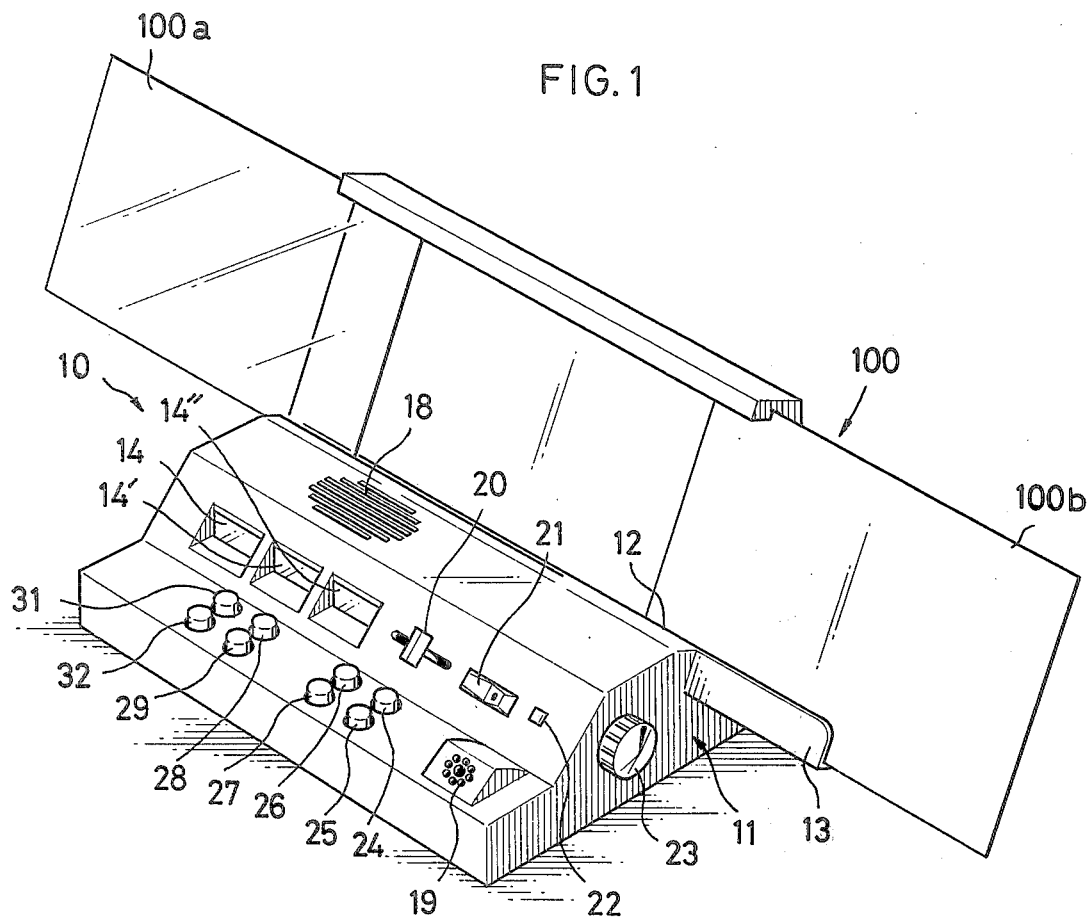
FIG. 1 is a perspective view showing the general construction of a language teaching apparatus according to the present invention.
Figure 2:
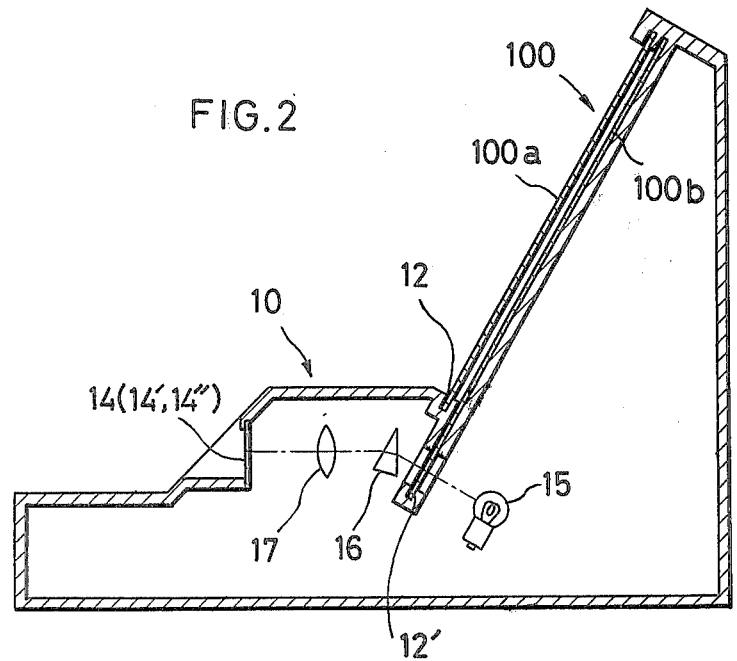
FIG. 2 is a section showing the internal construction of the language teaching apparatus as shown in FIG. 1.
Figure 5A:
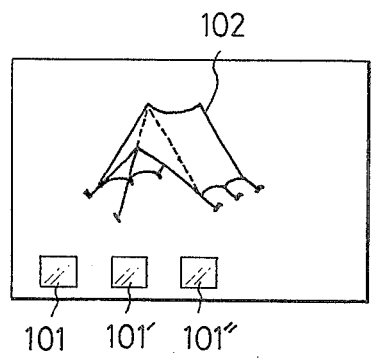
FIGS. 5a and 5b are top plan views showing the face and back of the teaching card of a single sheet construction for use with the language teaching apparatus of FIG. 1, respectively.
Figure 5B:
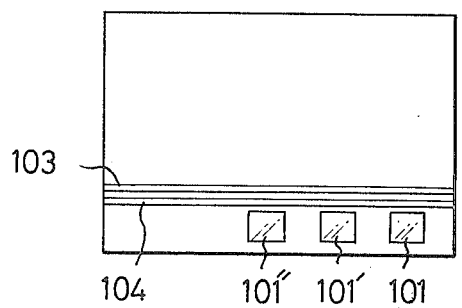
Figure 6:
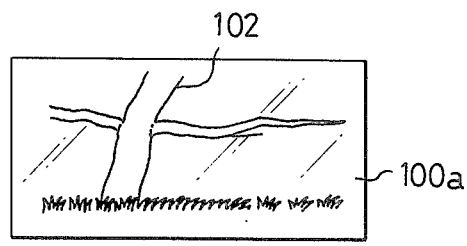
FIG. 6 is a top plan view showing one sheet of the teaching card of a two sheet construction for use with the language teaching apparatus of FIG. 1.
Figure 7A:
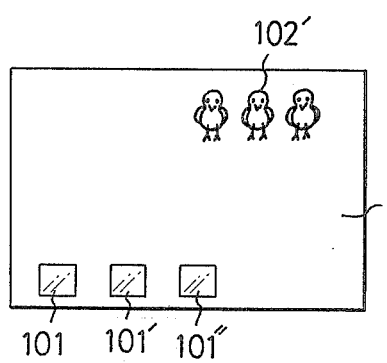
FIGS. 7a and 7b are top plan views showing the face and back of the other sheet of the teaching card of the two sheet construction for use with the sheet of FIG. 6.
Figure 7B:
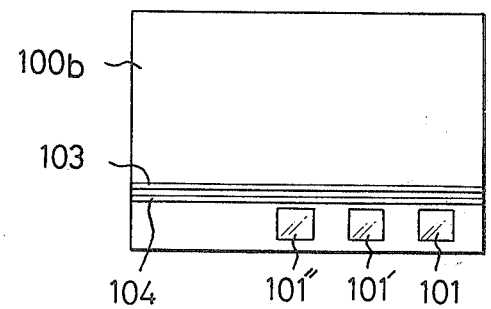

Reference will now be made to FIG. 1, in which a language teaching apparatus is generally shown at numeral 10. In a body 11 of the language teaching apparatus 10 is formed a vertical guide slot 12, which has a considerable depth and extends right and left so that a card, as generally indicated at numeral 100, may run therein in the sideway directions. At the righthand side of the body 11, there may be provided a card guide bracket 13 of a tray shape, which extends integrally from the guide slot 12 so as to guide the card 100 into the guide slot 12 correctly in the horizontal attitude. The body 11 has its front face formed with display screens 14, 14' and 14", on which a programmed information including pictures or words or both is displayed to provide a key word or the like for the program. The programmed information is photographed on miniature positive films or slides 101, 101' and 101" which are fixedly fitted in a lower portion of the card 100, as shown in FIGS. 5a and 5b. Although the card 100 may preferably be composed of two sheets 100a and 100b, as shown in FIGS. 6 and 7a, it is made of a single sheet in this instance for simplicity of discussion only. The detail discussion of the card 100 will be made with reference to FIGS. 5a and 5b for the single sheet construction and to FIGS. 6 to 9 for the two sheet construction. The optical informations on the slides 101, 101' and 101" are projected on the display screens 14, 14' and 14" through a projecting optical system, which may include light sources 15, 15' and 15", a corresponding number of prisms 16, 16' and 16" and a similarly corresponding number of enlarging lenses 17, 17' and 17", as shown in FIG. 2.

Reverting to FIG. 1, reference numerals 18, 19, 20, 21, 22 and 23 indicate a loudspeaker, a built-in microphone, a volume controller, a main switch, a pilot lamp which will lighten when the main switch 21 becomes conductive, and a question change-over dial, respectively. Likewise, reference numerals 24, 25, 26, 27, 28, 29, 31 and 32 indicate a question start button, a question repeat button, a basic answer start button, a basic answer repeat button, a first student's answer record button, a first student's answer reproduce button, a second student's answer record button and a second student's answer reproduce button, respectively, all of which constitute a manual control means of the language teaching apparatus 10 according to the present invention. The first answer record and reproduce buttons 28 and 29 are actuated or pushed during the forward running of the card 100 while the second answer record and reproduce buttons 31 and 32 are pushed during the backward running of the card 100.

In addition to the slides 101, 101' and 101", as shown in FIG. 5a, another information 102 including pictures or words or both for the main theme of a programmed question is provided in the card at such a position as can be exposed to the outside even when the card 100 is inserted in the guide slot 12 of the apparatus body 11. Furthermore, two bands of a magnetic material 103 and 104 are arranged horizontally on the back of the card 100, as shown in FIG. 5b.

Figure 3:
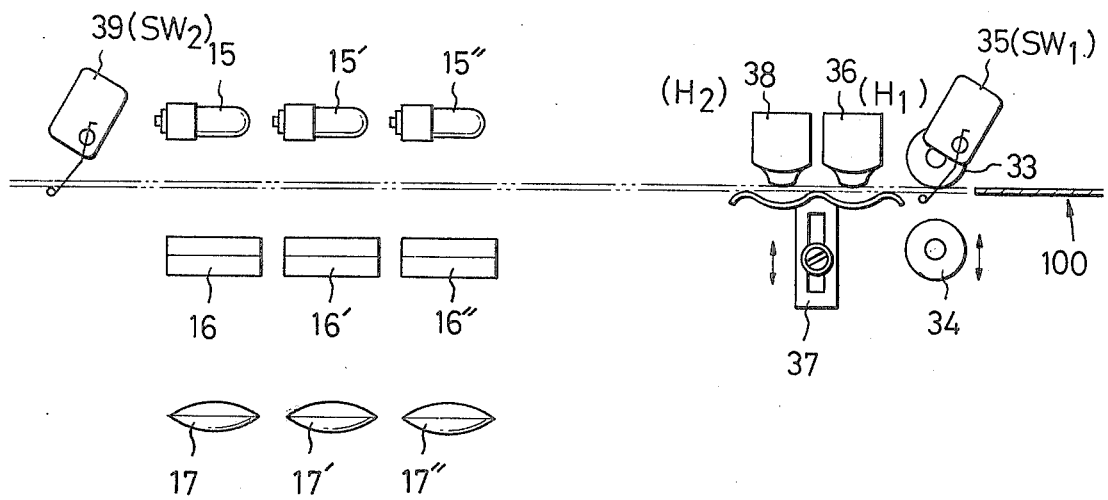
FIG. 3 is an enlarged diagrammatical view showing a major portion of the card operating mechanism of the language teaching apparatus of FIG. 1.

Turning now to FIG. 3, there are arranged inside of the apparatus body 11, particularly, in the vicinity of the guide slot 12 a magnetic recording and reproducing system, which includes major constituents together with their actuating mechanism and electric circuit (although not shown in FIG. 3) in accordance with the present invention. Those major constituents are composed, from the righthand side of FIG. 3, of a drive capstan 33, a pressure roller 34 for the drive capstan 33, a first switch $SW_1$ 35, a first reproduce magnetic head 36, a pressure pad 37 for the reproduce head 36, a second record and reproduce magnetic head 38, the three light sources 15, 15' and 15", the three corresponding prisms 16, 16' and 16", and a second switch $SW_2$ 39.

The language teaching apparatus of the present invention including the above-itemized major constituents will now be described in detail in connection with its operation.

28 CARD SETTING OPERATION

First of all, the main switch 21 is rendered conductive to supply a desired electric power to the language teaching apparatus. Then, the pilot lamp 22 is turned on to indicate that the main switch 21 becomes conductive. At the next step, the card 100 is arranged along the card guide bracket 13 into a predetermined position. This arrangement is preferably such that the card 100 has its lefthand leading end extending to a position slightly leftwardly of the line between the centers of the capstan 33 and the pressure roller 34. For this purpose, a suitable mark (not shown) may desirably be drawn on an edge portion of the guide slot 12 or the apparatus body 11. In this instance, the card 100 is inserted along the guide bracket 13 into the guide slot 12 until its lefthand leading end comes up to that mark. Alternatively, an upright claw member (not shown) may be mounted in a predetermined position of the running passage of the card 100. In the latter instance, when the card 100 is to be set, its lefthand leading end is brought into abutment engagement with the claw member to be retained in the predetermined position. In this instance, moreover, the claw member should be removed promptly after the setting operation into such a position as to place no obstacle in the running way of the card 100.

QUESTION REPRODUCING OPERATION

When the electric energy is applied and the card 100 is set at the predetermined position, then the question change-over dial 23 is manually turned to select one of the recorded questions. Once the question change-over dial 23 is turned by a predetermined angle, the two magnetic heads 36 and 38 are simultaneously shifted up and down a slight distance, so as to select the desired two magnetic tracks from the magnetic bands 103 and 104. For example, if the magnetic band 103 has eight tracks, the tracks 1, 3, 5 and 7 are used to record questions 1 to 4 for the forward direction, and the tracks 2, 4, 6 and 8 are used to record the basic answers each corresponding to the questions 1 to 4 for the backward direction. If, therefore, the question change-over dial 23 is turned to select the question 1, the first reproduce head 36 (which is of such a dual type having two not-shown reproduce elements "A" and "B" as is similar to a reproduce head of a stereophonic tape recording system) has its two reproduce elements A and B contacting with the tracks 1 and 5, respectively. In this instance, the reproduce element A is used to reproduce the questions while the reproduce element B is used to reproduce the corresonding basic answers, as will be easily understood.

When the question start button 24 is pushed after the question selecting step, both the pressure roller 34 and the pressure pad 37 are urged by the actions of the not-shown electric circuit and actuating mechanism to push the card 100 toward the drive capstan 33 and the first reproduce head 36. In this meanwhile, the drive capstan 33 is rotated to drive the card 100 in the forward or leftward direction of FIG. 3. While the card 100 is running in that direction, the reproduce element "A" of the first reproduce head 36 functions to reproduce the selected question, which has been recorded in advance in one of the tracks 1, 3, 5 and 7 of the magnetic band 103, from the loudspeaker 18. In this meanwhile, however, no electric power is applied to a reproduce electric circuit (not shown) of the reproduce element B, leaving the element B inoperative.

Figure 3A:
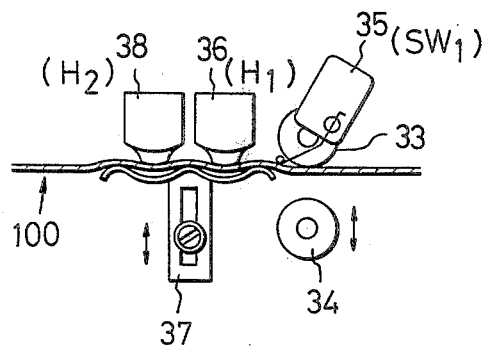
FIGS. 3a and 3b are also enlarged diagrammatica views showing two embodiments of a mechanism for increasing an operating contact area between a magnetic reproduce head and the recording medium of the teaching card, respectively.
Figure 3B:
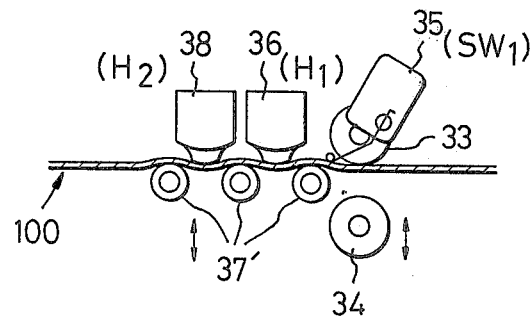

Here, in order to acquire larger operating contact area between the two magnetic head 36 and 38 and the magnetic bands, the pressure pad 37 may have such a curved edge and be so positioned that slight undulations may be formed of the card 100 between the heads 36 and 38 and the pressure pad 37, as better seen from FIG. 3a. For the same purpose, a series of rollers 37' may also be used in place of the pressure pad 37, as shown in FIG. 3b.

When the card 100 is moved into abutment engagement with the second switch $SW_2$ 39, as shown in imaginary lines in FIG. 3, the switch 39 is rendered operative to stop rotation of the drive capstan 33. Then, the light sources 15, 15' and 15'' are turned on so that the slides 101, 101' and 101'' of the card 100, which is now left stationary in response to the stoppage of the drive capstan 33, may be projected upon the corresponding display screens 14, 14' and 14'' through the prisms 16, 16' and 16'' and the lenses 17, 17' and 17''.

QUESTION REPEATING OPERATION

Figure 4:
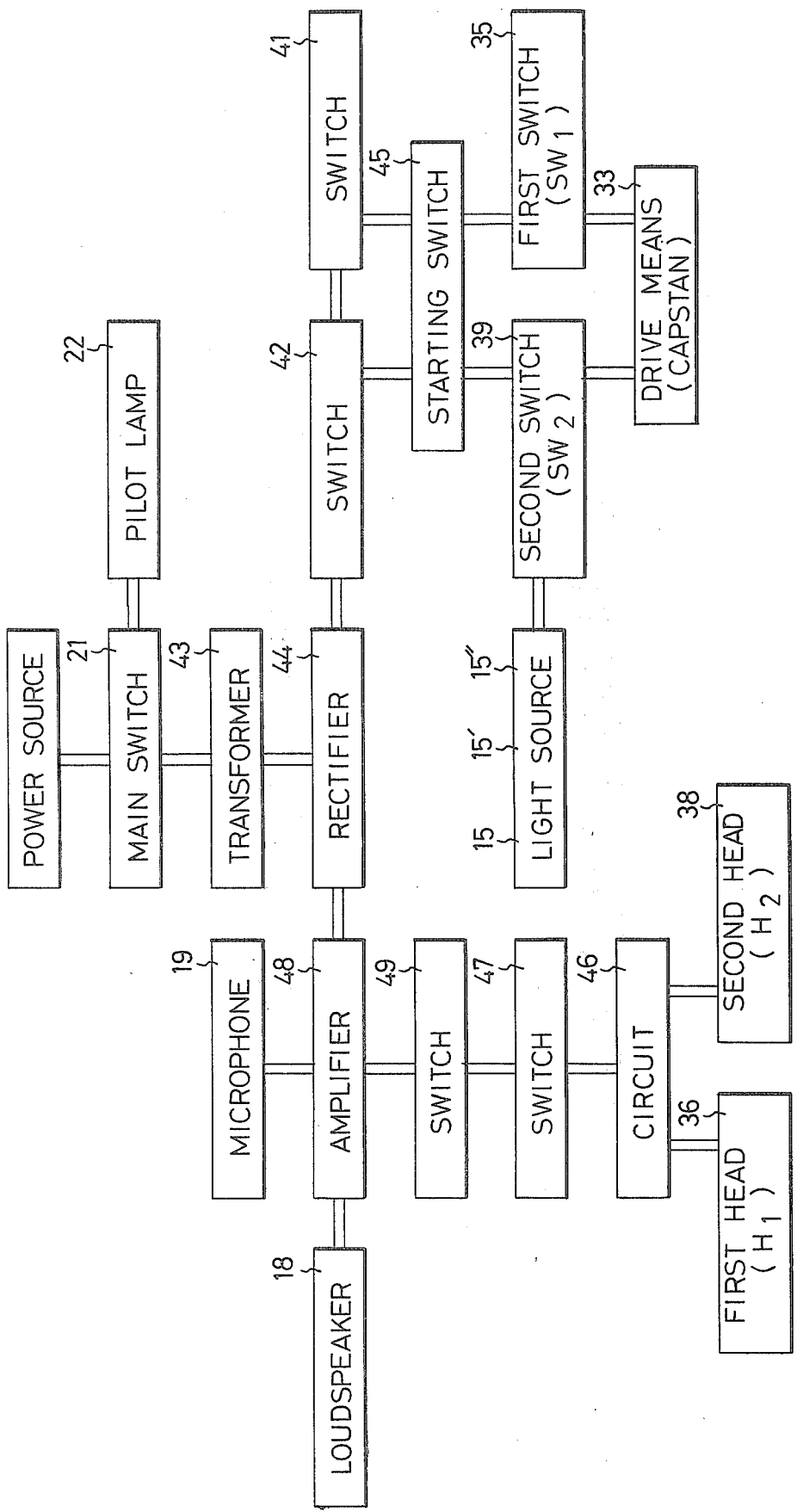
FIG. 4 is a block diagram showing the electric connections for use in the language teaching apparatus of FIG. 1.

The manipulation of the present teaching apparatus will then become quite different for the two following cases, that is to say, the case where the student desires to hear again the previous question and the case where he desires to hear the basic answer of the question. In the former case, the student is required to push the question repeat button 25. Then, a first polarity change-over switch 41, as shown in FIG. 4, which may be mechanically linked to the question repeat button 25, is so actuated that the drive capstan 33 may start to reverse the direction of its rotation. Simultaneously, the reproduce circuit for the reproduce element A of the first magnetic head 36 stops receiving the necessary electric power. In an alternative, the polarity change-over switch 41 may also be arranged, although not shown, in the vicinity of the second switch $SW_2$ 39 so that it may be automatically actuated in response to its engagement with and disengagement from the card 100 so as to start its reversing operation. Since, in this instance, both the pressure roller 34 and the pressure pad or rollers 37 or 37' have been left under the urged condition (If desired, the latter may alternatively be kept apart from the card 100 during this backward running operation.), the backward rotation of the drive capstan 33 will move the card 100 in the backward direction. When the card 100 begins to run in the backward direction, its lefthand leading end is disengaged from the second switch $SW_2$ 39 so that the light sources 15, 15' and 15'' are turned off. In case of the mechanical linkage, however, the backward movement of the card 100 will continue while the question repeat button 25 is being depressed. (This is because the polarity change-over switch 41 is maintained in its operative condition during that time period only.) For instance, if the question repeat button 25 is released while the card 100 is moving backward, it is returned to its "off" position to actuate the switch 41, and the capstan 33 instantly changes the direction of its rotation into the forward direction to carry the card 100 in the forward direction. At this instant, the reproduce circuit of the reproduce element A is supplied with the electric power. In the case, on the contrary, where the polarity change-over switch 41 is automatically actuated by the running card 100, it may be rendered operative by its engagement with and disengagement from the lefthand end of the card after the question repeat button 25 has been pushed. In this latter case, the reversing operation of the switch 41 may be carried out instantly or after a predetermined time delay which may be effected by a present delay circuit. In the former case, however, where the polarity change-over switch 41 is mechanically linked to the question repeat button 25, where the button 25 is kept depressed until the card 100 moves in the righthand direction to such an extent as to have its lefthand leading end pass over the first switch $SW_1$ 35, the card 100 is then stopped by the action of the first switch 35. If the question repeat button 25 is released upon stoppage of the card 100, the polarity change-over switch 41 is so actuated that the drive capstan 33 may change instantly its rotation into the forward direction, and that the power supply to the reproduce circuit of the reproduce element A may be started again to accomplish the same reproducing operation of the question as that described in the beforehand. When the card 100 is moved to the position as shown in the imaginary lines in FIG. 3, the light sources 15, 15' and 15'' are turned on and the drive capstan 33 is stopped, as has been described in the beforehand. The resultant condition is just the same as that after the first question has been presented to the student.

BASIC ANSWER REPRODUCING OPERATION

After the student can understand sufficiently the question and the answer flashed through his mind, he is required to push the basic answer start button 26. Then, the question start button 24 is returned to its "off" position. The electric power supply to the reproduce element A of the first reproduce head 36 is interrupted, but simultaneously the power supply to the other reproduce element B of the head 36 is started. Then, a second polarity change-over switch 42, as shown in FIG. 4, which is also mechanically linked to the basic answer start button 26, is actuated to reverse the direction of rotation of the capstan 33. As the card 100 is moved in the backward direction, its lefthand leading end is disengaged from the second switch $SW_2$ 39 to turn off the light sources 15, 15' and 15''. Then, one of the basic answers, which have been recorded on the tracks 2, 4, 6 and 8 of the magnetic band 103, may be reproduced from the loudspeaker 18. When the card 100 is moved rightwardly with its righthand leading end passing over the first switch $SW_1$ 35, this switch 35 is actuated to stop the drive capstan 33.

BASIC ANSWER REPEATING OPERATION

In the case where it is desired to hear again the corresponding basic answer which has been recorded in the magnetic band 103, the student is required to push the basic answer repeat button 27. Then, the first polarity change-over switch 41, which may be mechanically linked to the basic answer repeat button 27, is actuated so that the capstan 33 may accomplish its forward rotation. At the same time, the power supply to the reproduce element B of the first head 36 is interrupted. Although not shown, the change-over switch may also be arranged in the vicinity of the first switch $SW_1$ 35 so that it may be automatically actuated in response to its engagement with and disengagement from the running card 100 so as to start its reversing operation. In the former case of the mechanical linkage, however, the resultant forward movement of the card 100 will continue during the time period while the basic answer repeat button 27 is being depressed. For instance, if the answer repeat button 27 is released while the card is moving foward, it is returned to its "off" position to actuate the first polarity change-over switch 41, and the capstan 33 instantly changes the direction of its rotation into the backward direction to carry the card 100 in the backward direction. At this instant, the reproduce circuit of the reproduce element "B" is supplied with the electric power. In the case, on the contrary, where the basic answer repeat button 27 is kept depressed until the card 100 takes such a position as is depicted in the imaginary lines in FIG. 3, the second switch $SW_2$ 39 is actuated by its engagement with the lefthand leading end of the card 100 to stop its forwarding operation. In this basic answer repeating operation, the light sources 15, 15' and 15'' are turned on by the action of the second switch $SW_2$, as has been described in the foregoing (If desired, these light sources may be left extenguished.). In the latter case of the automatic actuation, however, the first polarity change-over switch 41 may be actuated by its engagement with the righthand leading end of the card 100 after the basic answer repeat button 27 has been pushed.

In the former case of the mechanical linkage, on the contrary, the basic answer repeat button 27 is released after the card 100 is stopped by the action of the second switch $SW_2$ 39. Then, the first polarity change-over switch 41 is actuated to instantly rotate the capstan 33 in the backward direction and at the same time to supply the electric power to the reproduce circuit of the reproduce element B of the first reproduce head 36. In this way, the basic answer repeating operation is carried out, and the desired basic answer is reproduced once from the loudspeaker 18. Finally, the capstan 33 is stopped by the action of the first switch $SW_1$ 35 similarly to the case of the first or preceding basic answer reproducing operation, as has been described.

STUDENT'S ANSWER RECORDING AND REPRODUCING OPERATIONS

When it is intended to record and reproduce the answer of the student himself, the record and reproduce head 38 (which may be of such a dual type similar to the first head 36 as having two record and reproduce elements A and B) is used together with the magnetic band 104 (which may also be of such a type similar to the magnetic band 103 as having eight tracks). Thus, the recording and reproducing operations of the student's answer are substantially similar to that using the head 36 and the magnetic band 103. More specifically, when the first answer record button 28 is pushed, the student's answer, which is being caught by the built-in microphone 19 during the forward running operation (from the right to the left of FIG. 3) of the card 100, is recorded, for instance, on the track 1 of the magnetic band 104. When this card 100 arrives at the lefthand end of FIG. 3, the recording operation is stopped. In every case where the second record and reproduce head 38 is made operative, the power supply to the first reproduce head 36 is interrupted.

When the second answer record button 31 is pushed to return the first answer record button 32 to its "off" position with the card 100 being left at the left end of the present teaching apparatus 10, the second answer of the student is recorded, for instance, on the track 2 of the magnetic band 104 by the return (or backward) running operation of the card 100.

When the student's answer is to be reproduced, the first and second answer reproduce buttons 29 and 32 are pushed to reproduce the corresponding first and second answers which have been recorded during the forward and backward running operations, respectively.

In one representative of the actual manipulations of the language teaching apparatus according to the present invention, the question start button 24 is pushed to hear the recorded question, and then the second answer record button 31 is pushed to record the answer of the student himself. Then, the basic answer repeat button 27 is pushed to hear the basic answer. After that, the first answer record button 28 is pushed to record the correct answer of the student in accordance with the basic answer. The student's answer thus recorded can be, if desired, heard and compared with the basic answer by alternatively pushing the buttons 26, 27, 29 and 32. In this regard a variety of modifications of manipulation are conceivable for the actual use of the teaching apparatus in accordance with the desires of the student himself, as will be easily understood. Incidentally, it is when the main switch 21 is rendered nonconductive that all the operations are returned to their initial conditions before their uses.

Now, with closer reference to FIG. 4 and the following Table, the language teaching apparatus according to the present invention will be described in more detail, especially, in respect of its manual control means including the buttons 24, 25, 26, 27, 28, 29, 31 and 32 and its electric circuit including the first and second switches $SW_1$ 35 and $SW_2$ 39 and the polarity change-over switches 41 and 42. However, the mechanical means, which is actuatable for rotating the capstan 33 and for selectively moving the pressure roller 34 and the pressure pad or rollers 37 or 37', may be similar to that of a tape recorder, and its redundant explanation is omitted here.

Table

| Mode of Operation | Element | Sw 42 | Sw 41 | Sw 45 | $Sw_1$ 35 | $Sw_2$ 39 | L.S. 15 | Amp. 48 | Sw 49 | Sw 47 | Circ. 46 | $H_1$ 36 | $H_2$ 38 | Cap. 33 | Name No. | Ref. of Operation, |
|---|---|---|---|---|---|---|---|---|---|---|---|---|---|---|---|---|
| Card | | | | | | | | | | | | | | | | |

Table-continued

| Mode of Operation | Ele-ment | Sw 42 | Sw 41 | Sw 45 | Sw₁ 35 | Sw₂ 39 | L.S. 15 | Amp. 48 | Sw 49 | Sw 47 | Circ. 46 | H₁ 36 | H₂ 38 | Cap. 33 | Name No. | Ref. of Operation |
|---|---|---|---|---|---|---|---|---|---|---|---|---|---|---|---|---|
| Setting | | P | P | Off | Off | On | Off | Rep. | Off | H₁ | A | Op. | In. | Stp. | | (i) |
| Question | | P | P | On | On | On | Off | Rep. | Off | H₁ | A | Op. | In. | F | (a) | (ii) |
| Reproduce | | P | P | On | On* | Off | On | Rep. | Off | H₁ | A | Op. | In. | Stp. | (b) | |
| | | P | N | On | On* | On* | Off* | Rep. | On | H₁ | A | In. | In. | B | (a) | |
| Question | | P | N | On | Off | On | Off | Rep. | On | H₁ | A | In. | In. | Stp. | (b) | (iii) |
| Repeat | | P | P | On | On* | On | Off | Rep. | Off | H₁ | A | Op. | In. | F | (c) | |
| | | P | P | On | On* | Off | On | Rep. | Off | H₁ | A | Op. | In. | Stp. | (d) | |
| Answer | | N | P | FN | On* | On* | Off* | Rep. | Off | H₁ | B | Op. | In. | B | (a) | (iv) |
| Reproduce | | N | P | On | Off | On | Off | Rep. | Off | H₁ | B | Op. | In. | Stp. | (b) | |
| Answer | | N | N | On | On* | On | Off | Rep. | On | H₁ | B | In. | In. | F | (a) | |
| | | N | N | On | On | Off | On | Rep. | On | H₁ | B | In. | In. | Stp. | (b) | |
| Repeat | | N | P | On | On | On* | Off* | Rep. | Off | H₁ | B | Op. | In. | B | (c) | (v) |
| 1st | | N | P | On | Off | On | Off | Rep. | Off | H₁ | B | Op. | In. | Stp. | (d) | |
| Answer | | P | P | FN | On* | On | Off | Rec. | Off | H₂ | A | In. | Op. | F | (a) | (vi) |
| Record IInd | | P | P | On | On | Off | On | Rec. | Off | H₂ | A | In. | Op. | Stp. | (b) | |
| Answer | | N | P | FN | On | On* | Off* | Rec. | Off | H₂ | B | In. | Op. | B | (a) | (vii) |
| Record 1st | | N | P | On | Off | On | Off | Rec. | Off | H₂ | B | In. | Op. | Stp. | (b) | |
| Answer | | P | P | FN | On* | On | Off | Rep. | Off | H₂ | A | In. | Op. | F | (a) | (viii) |
| Reproduce IInd | | P | P | On | On | Off | On | Rep. | Off | H₂ | A | In. | Op. | Stp. | (b) | |
| Answer | | N | P | FN | On | On* | Off* | Rep. | Off | H₂ | B | In. | Op. | B | (a) | (ix) |
| Reproduce | | N | P | On | Off | On | Off | Rep. | Off | H₂ | B | In. | Op. | Stp. | (b) | |

Appendix to the Table

In the above Table, the References of Operation are set to correspond to the following concrete operations:
(i) The Card Setting Operation when the card 100 is set in the language teaching machine 100 of the present invention;
(ii) The Question Reproducing Operation
 (a) when the question start button 24 is pushed, and
 (b) when the card 100 is stopped by the action of the second switch 39;
(iii) The Question Repeating Operation
 (a) when the question repeat button 25 is pushed,
 (b) when the card 100 is stopped by the action of the first switch 35,
 (c) when the question repeat button 25 is released, and
 (d) when the card 100 is stopped by the action of the second switch 39;
(iv) The Basic Answer Reproducing Operation
 (a) when the basic answer start button 26 is pushed, and
 (b) when the card 100 is stopped by the action of the first switch 35;
(v) The Basic Answer Repeating Operation
 (a) when the basic answer repeat button 27 is pushed,
 (b) when the card 100 is stopped by the action of the second switch 39,
 (c) when the basic answer repeat button 27 is released, and
 (d) when the card 100 is stopped by the action of the first switch 35;
(vi) The First Answer Recording Operation
 (a) when the first answer record button 28 is pushed, and
 (b) when the card 100 is stopped by the action of the second switch 39;
(vii) The Second Answer Recording Operation
 (a) when the second answer record button 31 is pushed, and
 (b) when the card 100 is stopped by the action of the first switch 35;
(viii) The First Answer Reproducing Operation
 (a) when the first answer reproduce button 29 is pushed, and
 (b) when the card 100 is stopped by the action of the second switch 39; and
(ix) The Second Answer Reproducing Operation
 (a) when the second answer reproduce button 32 is pushed, and
 (b) when the card 100 is stopped by the action of the first switch 35.
In the Table, moreover, the following nomenclatures are adopted:
P : Positive;
N : Negative;
FN : Temporarily "Off" and soon "On";
On* : "On" as the card 100 moves;
Off* : "Off" as the card 100 moves;
Rep. : Reproduce;
Rec. : Record;
A : Element A;
B : Element B;
Op. : Operative;
In. : Inoperative;
F : Forward movement;
Stp. : Stopped; and
B : Backward movement.

Before the card setting operation, the main switch 21 is turned on to supply the electric power from the power source to the electric circuit of the present language teaching apparatus. Then, the pilot lamp 22 is lighted to indicate that the main switch 21 is conductive. The electric power thus supplied is applied to a transformer 43 so that its voltage of 100 V may be reduced into a predetermined low level, for example, 12 V. The AC power thus transformed is then supplied to a rectifier 44, where it is rectified into a DC power.

CARD SETTING OPERATION

Under the above condition, the card 100 is arranged at a predetermined position. In this instance, the polarity change-over switches 41 and 42 are preset to be positive while the first and second switches SW₁ 35 and SW₂ 39 are preset to be under the conditions of "off" and "on", as seen from the first line (indicating the "card setting operation") of the Table.

QUESTION REPRODUCING OPERATION

After the selection of the question, the question start button 24 is pushed. Then, a starting switch 45, which is mechanically linked to the question start button 24, is turned on to effect rotation of the capstan 33. (Not only this starting switch 45 but also the polarity change-over switch 42 are mechanically linked to the question start button 24 and to the basic answer start button 26.) At this instant, an A – B element change-over circuit 46 for the heads 36 and 38 (which is electrically connected with the polarity change-over switch 42) and a head change-over switch 47 (which is mechanically linked to the first answer record switch 28, the first answer reproduce switch 29, the second answer record switch 31 and the second answer reproduce switch 32) are so connected as to supply the electric power to the reproduce element A of the reproduce head $H_1$ 36.

The card 100 is made to run in the leftward direction by the forward rotation of the capstan 33. The first switch $SW_1$ is turned on as the card 100 moves.

During this running operation of the card 100, the reproduce element A of the reproduce head $H_1$ 36 acts to reproduce through a record and reproduce amplifier 48 and the loudspeaker 18 one of the questions, which are recorded in the tracks 1, 3, 5 and 7 of the magnetic band 103. In this meanwhile, no electric power is supplied to the reproduce element "B" of the head $H_1$ 36 by the action of the A - B element change-over circuit 46.

When the lefthand leading end of the card 100 abuts against the second switch $SW_2$ 39, this switch 39 is turned off to stop rotation of the capstan 33. At the same time, the light sources 15, 15' and 15" are extinguished.

QUESTION REPEATING OPERATION

When the question repeat button 25 is pushed for the question repeating operation both the first polarity change-over switch 41 and a head input interrupting switch 49, which are mechanically linked to the question repeat button 25, are actuated to reverse the rotation of the capstan 33 and to interrupt the power supply to the reproduce element A of the head $H_1$ 36. In this meanwhile, the question start button 24 is kept depressed, and the starting switch 45 is maintained conductive.

As the card 100 is moved in the backward direction, it has its lefthand leading end disengaged from the second switch $SW_2$ 39 with the resultant extinguishment of the light sources 15, 15' and 15". This backward movement of the card 100 will continue during the time while the question repeat button 25 is depressed.

If the question repeat button 25 is released during the backward movement of the card 100, both the first polarity change-over switch 41 and the head input interrupting switch 49 are actuated partly to effect the forward rotation of the capstan 33 and partly to effect the power supply to the reproduce circuit for the reproduce element A of the head $H_1$ 36. If, on the other hand, the question repeat button 25 is kept depressed to the last, the first switch $SW_1$ 36 is brought into engagement with the righthand leading end of the card 100 and is actuated thereby to stop the backward movement of the card 100. (The first switch 36 is turned off.) In this instance, if the question repeat button 25 is released, the first polarity change-over switch 41 and the head input interrupting switch 49 are actuated to instantly effect the forward rotation of the capstan 33 and to supply the electric power to the reproduce circuit for the reproduce head A of the head $H_1$ 36. The subsequent operations are similar to those effected when the question start button 24 is pushed, as has been described in the above.

BASIC ANSWER REPRODUCING OPERATION

The basic answer start button 26 is pushed to actuate the second polarity change-over switch 42 and the starting switch 45, both of which are mechanically linked thereto. This starting switch 45 is rendered temporarily nonconductive, when the question start button 24 is moved into its "off" position, and soon conductive by the action of the basic answer start button 26, with the resultant backward rotation of the capstan 33.

Then, the A-B element change-over circuit 46 and the head change-over switch 47 are so connected as to supply the electric power to the reproduce element B of the head $H_1$ 36. (Here, the head input interrupting switch 49 is kept inconductive.)

As the card 100 is moved in the backward direction, its lefthand leading end is disengaged from the second switch $SW_2$ 39, and the light sources 15, 15' and 15" are extinguished. When the backward movement of the card 100 proceeds to have its righthand leading end pass over the first switch $SW_1$ 35, this switch 35 is actuated (or turned off) to stop the capstan 33.

BASIC ANSWER REPEATING OPERATION

When the basic answer repeat button 27 is pushed, the first polarity change-over switch 41 and the head input interrupting switch 49 are actuated partly to effect the forward rotation of the capstan 33 and partly to interrupt the power supply to the reproduce element B of the head $H_1$ 36. The subsequent operations are similar to those effected when in the question repeating operation.

If the basic answer repeat button 27 is kept depressed to the last, the switch $SW_2$ 39 abuts against the lefthand leading end of the approaching card 100 and is rendered nonconductive to stop the capstan 33, with the resultant lighting of the light sources 15, 15' and 15". In this instance, the basic answer start button 26 is maintained conductive, and the second polarity change-over switch 42 and the starting switch 45 are not varied.

If, on the other hand, the basic answer repeat button 27 is released, the first polarity change-over switch 41 and the head input interrupting switch 49 are actuated to effect the backward movement of the capstan 33 and the power supply to the reproduce element B of the head $H_1$ 36 and to move the card 100 in the backward direction. The light sources 15, 15' and 15" are extinguished by the action of the switch $SW_2$ 39. When the card 100 is disengaged from the switch $SW_1$ 36, the capstan 33 is stopped.

FIRST STUDENT'S ANSWER RECORDING OPERATION

When the first answer record button 28 is pushed to record the answer of the student himself, the record and reproduce amplifier 48 is changed into the recording operation. Then, the head change-over switch 47 and the A - B element change-over circuit 46 are actuated to supply the electric power to the record and reproduce element A of the record and reproduce head $H_2$ 38. At this instant, the starting switch 45 (which is mechanically linked to the first and second answer record buttons 28 and 31 and to the first and second answer reproduce buttons 29 32) is rendered conductive to begin rotation of the capstan 33 so that the card 100 may be moved in the forward direction. Now, the student can start the recording operation with use of the built-in microphone 19. The subsequent operations are similar to those for the question reproducing operation.

SECOND STUDENT'S ANSWER RECORDING OPERATION

When the second answer record button 31 is pushed, the first answer record button 28 is returned to its "off" position. The starting switch 45 is rendered temporarily nonconductive but soon conductive. Then, the second polarity change-over switch 42, which is mechanically linked to the second answer record switch 31, is actuated to effect the backward rotation of the capstan 33. At this instant, the power supply to the record and reproduce element A of the head $H_2$ 38 is interrupted, and the record and reproduce element B is supplied with the electric power. The subsequent operations are similar to those for the basic answer reproducing operation.

FIRST AND SECOND STUDENT'S ANSWER RECORDING OPERATIONS

When the first answer reproduce button 29 is pushed to reproduce the first answer of the student himself, the starting switch 45 is rendered conductive. In this meanwhile, the record and reproduce amplifier 48 is changed into its reproducing operation, and the A - B element change-over circuit 46 is ready for the operation of the record and reproduce element B of the head $H_2$ 38. Upon conduction of the starting switch 45, the capstan 33 is rotated in the forward direction to reproduce the recorded answer through the loudspeaker 18. The subsequent operations are similar to those for the first and second answer recording operations, excepting that the record and reproduce amplifier 48 is under the condition for reproduction.

For the second answer reproducing operation, the student is required to push the second answer reproduce button 32. The subsequent operations will be easily understood from the above explanation in view of the Table.

Turning now to FIGS. 5a and 5b, the card 100 is to be used in the language teaching apparatus according to the present invention will be explained for the case where it has a single sheet construction. The relationships among the pictures or words or both 102 written in the card 100, the image photographed in the slides 101, 101' and 101", and the questions and corresponding answers recorded in the magnetic band 103 are as follows. For instance, let it be assumed that the key information 102 be a picture of a tent, as shown in FIG. 5a. Then, the first question asks "What is this ?", and the second question asks "To what kind of sports does this relate ?". In this instance, the slides 101, 101' and 101" have pictures of golf, climbing and skating, respectively. Then, the basic answer to the first question is "This is a tent.", while the basic answer to the second question is "This relates to climbing.".

With reference to FIGS. 6 to 9, the card or its assembly 100 having a two sheet construction will now be described. This card assembly 100 can be used in the language teaching machine with better results. The card assembly 100 is composed of a sheet 100a and a sheet 100b, as shown in FIGS. 6, 7a and 7b. The sheet 100a is, in this example, made of a transparent material such as a plastic material or the like, and has thereon the key information 102 including a picture and/or words. In the embodiment as shown in FIG. 6, the key information 102 is a picture of a tree having branches.

The other sheet 100b is, in this example, made of an opaque material such as a sheet of hard paper or a plastic material, and has thereon an additional information 102' including a picture and/or words. As has been described in the beforehand, the three miniature positive films or slides 101, 101' and 101" are arranged in the lower portion of the sheet 100b, and the two magnetic bands 103 and 104 are arranged on the back of the sheet 100b. In the embodiment of FIG. 7a, the additional information 102' is a picture of three birds.

The card assembly 100, in which the two sheets 100a and 100b are placed one on the other, is set altogether in a predetermined position along the card guide bracket 13, as shown in FIG. 1. Since, in this instance, the sheet 100a is made of a transparent material, the two pictures 102 and 102' can be observed altogether. In the above embodiment, for instance, it appears that three birds perch on the branches of a tree.

Thus, the question to be recorded in the magnetic band 103 is, for example, "What are there on the tree?" or "How many birds are there on the tree?", and the words such as "three", "a bird" and "there is" are written in the slides 101, 101' and 101". Then, the basic answer to the above question speaks "There are three birds on the tree."

Figure 7C:
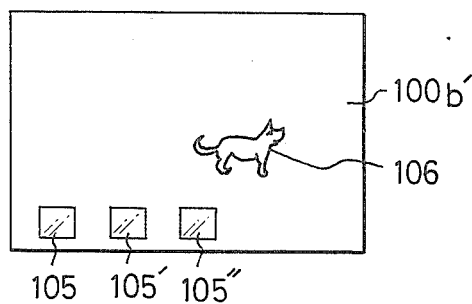
FIG. 7c is similar to FIGS. 7a and 7b but shows another embodiment of the other sheet of the teaching card of the two sheet construction.

Then, the sheet 100a is left as it is, but the sheet 100b is replaced by another sheet 100b', as shown in FIG. 7c. Similarly to the sheet 100b, the additional sheet 100b' also has slides 105, 105' and 105" and two magnetic bands (which are not shown). On the face of the sheet 100b', there is a picture of a dog as an additional information 106. Then, the question to be recorded asks "What is there under the tree?" and the corresponding answer speaks "There is a dog under the tree." In this embodiment, the words such as "a dog", "a monkey" and "a rat" are written in the slides 105, 105' and 105".

A variety of applications are conceivable including the embodiment, in which a picture of a cup is drawn as the key information in the transparent sheet, and in which the level of water in the cup is suitably varied by the additional information of the opaque sheet. In accordance with these informations, questions and their basic answers can be recorded.

Figure 8:
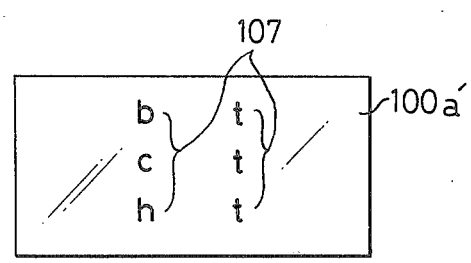
FIG. 8 is similar to FIG. 6 but shows another embodiment of the one sheet of the teaching card of the two sheet construction.
Figure 9:
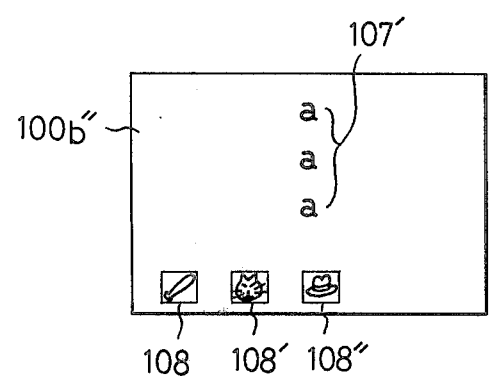
FIG. 9 is similar to FIGS. 7a, 7b and 7c but shows another embodiment of the other sheet of the teaching card of the two sheet construction.

In another embodiment shown in FIGS. 8 and 9, english words having their intermediate vowels omitted are written in a transparent sheet 100a', and the omitted vowels are written in the paired opaque sheet 100b", so as to carry out the study, in which words are memorized systimatically. In this embodiment, it is necessary to illustrate in slides 108, 108' and 108" of the opaque sheet 100b" the articles or conditions which are implied by the respective words. For example, in the embodiment of FIGS. 8 and 9, the pictures of a bat, a cat and a hat are photographed on the slides 108, 108' and 108", respectively.

In this embodiment, moreover, such a combination is conceived that one of the same vowels written in the sheet 100a' has a different pronunciation to ask the student to choose the word having the different pronunciation.

Other various modes of study can be conceived with use of the card assembly 100 having the two sheet construction, thus making it possible to develop a wide variety of software for the language study.

Although the card assembly having the two sheet construction has been described in detail in connection with the above embodiments, it should be understood that a variety of modifications can be made without departing from the teachings and concepts of the above embodiments. For example, the sheet 100a or 100a' can be made of an opaque material, and the additional sheet 100b, 100b' or 100b'' can be made of a transparent material. In this example, the setting of the card assembly in the language teaching apparatus should be made such that the additional sheet is placed in front of the opaque sheet. In this example, moreover, the two magnetic bands 103 and 104 of the additional sheet can be arranged on the front face thereof (For this arrangement, the magnetic heads of the apparatus should be changed accordingly.). In an alternative, the two sheets may desirably be made of a transparent material.

In addition, the two sheets may be separately inserted from the both sides into the guide slot of the apparatus body so that they may be superposed progressively as one moves toward the other while reproducing the recorded question until they are completely overlaid one on the other to produce a quite different visual information. This technique is useful for waking the curiosity of the student by its visual change.

What is claimed is:
1. A language teaching apparatus comprising:
   at least one teaching card having visual information, a plurality of image slides for projection and concerning the visual information, and at least one horizontal magnetic recording medium;
   a corresponding plurality of display screens arranged in the front face of said body for displaying the images of the slides;
   a corresponding plurality of optical systems for projecting the images on said display screens;
   a body formed with an upright guide slot, in which a teaching card is allowed to run horizontally in the forward and backward directions;
   card drive means including capstan means rotatable back and forth for driving the card when in contact herewith, and pressure means movable towards said capstan means for urging the card into contact with the same;
   magnetic reproduce means including at least one reproduce head for magnetically reproducing, when in contact with the recording medium of the card, an audio information which is recorded in the recording medium, and pressure means movable towards said reproduce head for urging the recording medium into contact with the same;
   mechanical means actuatable for rotating said capstan means and for selectively moving the first- and second-named pressure means;
   electric circuit means controllable for actuating said mechanical means;
   manual control means manually actuatable for controlling said electric circuit means;
   first switch means actuatable in response to its engagement with and disengagement from the running card for defining the starting point of the forward running of the card and for controlling said electric circuit means together with said manual control means;
   second switch means actuatable in response to its engagement with and disengagement from the running card for defining the final point of the forward running of the card to restrict the running range of the card together with the first-named switch means and for controlling said electric circuit means together with the first-named switch means and said manual control means; and
   repeat switch means including at least one reverse switch means for controlling said electric circuit means together with the first- and second-named switch means and said manual control means to reverse the direction of rotation of said capstan means to thereby return the card to its starting point of the preceding stroke so that the audio information may be reproduced once more.

2. An improved language teaching apparatus according to claim 1, wherein said reverse switch means is arranged in the vicinity of one of the first- and second-named switch means and is automatically actuatable in response to its engagement with and disengagement from the running card to accomplish its reversing operation.

3. An improved language teaching apparatus according to claim 2, wherein said reverse switch means is operable to accomplish its reversing operation instantly.

4. An improved language teaching apparatus according to claim 2, wherein said electric circuit means includes a delay circuit so that said reverse switch means may accomplish its reversing operation after a predetermined time delay.

5. An improved language teaching apparatus according to claim 1, wherein said reverse switch means is mechanically linked to said manual control means and is manually actuatable to accomplish its reversing operation.

6. An improved language teaching apparatus according to claim 5, wherein said reverse switch means is operable to accomplish its reversing operation instantly.

7. An improved language teaching apparatus according to claim 5, wherein said electric circuit means includes a delay circuit so that said reverse switch means may accomplish its reversing operation after a predetermined time delay.

8. An improved language teaching apparatus according to claim 1, wherein the recording medium has forward and backward magnetic bands, in which a question concerning the visual information and a basic answer corresponding to the question are magnetically recorded, respectively; wherein said reproduce head is of a dual type having two reproducing elements for reproducing the question and the basic answer, respectively; and wherein said repeat switch means includes two reverse switch means for reversing the forward and backward runnings of the card, respectively, so that one of the question and the answer may be reproduced once more.

9. An improved language teaching apparatus according to claim 8, wherein said two reverse switch means are arranged in the vicinity of the first- and second-named switch means and are automatically actuatable in response to their engagement with and disengagement from the running card to accomplish their reversing operations.

10. An improved language teaching apparatus according to claim 8, wherein said two reverse switch means are mechanically linked to said manual control means and are manually actuatable in a coactive manner to accomplish their reversing operations.

11. An improved language teaching apparatus according to claim 8, wherein each of the formed and backward magnetic bands has a plurality of magnetic tracks which have a corresponding number of questions and their answers; further comprising: question change-over means having its position manually controllable for selecting the desired one of the tracks; and head moving means coactive with said question change-over means for vertically moving said reproduce head into such a position as to have the reproducing elements thereof facing the desired tracks.

12. An improved language teaching apparatus according to claim 1, wherein the card further has a magnetically recording horizontal medium arranged in parallel with the first-named recording medium; further comprising: magnetic record and reproduce means arranged in the vicinity of said magnetic reproduce means and including a record and reproduce head for magnetically recording and reproducing, when in contact with the second-named recording medium, the audio information which is answered by the operator of said language teaching apparatus in response to the visual information and the audio information which is recorded in the second-named recording medium in accordance with the answered audio informations, respectively, and converting means receptive of the oral response of the operator for converting the same into the electric signals for the recording operation.

13. An improved language teaching apparatus according to claim 12, wherein the second-named recording medium has forward and backward magnetic bands, in which at least two answer audio informations are magnetically recorded and reproduced, respectively, wherein said record and reproduce head is of a dual type having two recording and reproducing elements for recording and reproducing the first and second answer audio informations of the operator, respectively.

14. An improved language teaching apparatus according to claim 1, wherein said magnetic reproduce means is arranged immediately downstream of said drive means; wherein the first-named switch means is arranged upstream of said magnetic reproduce means; and wherein the second-named switch means is arranged downstream of the first-named switch means a predetermined distance substantially equal to the width of the card.

15. An improved language teaching apparatus according to claim 1, wherein the second-named pressure means is so configured and positioned, when moved to said reproduce head, as to form slight undulations of the card so as to provide a larger operating contact area between said reproduce head and the recording medium of the card.

16. In a language teaching apparatus comprising: a body formed with an upright guide slot; card drive means including capstan means rotatable back and forth, and first pressure means movable towards said capstan means; magnetic reproduce means including at least one reproduce head for magnetically reproducing an audio information, and second pressure means movable towards said reproduce head; mechanical means actuatable for rotating said capstan means and for selectively moving the first- and second-named pressure means; electric circuit means controllable for actuating said mechanical means; and manual control means manually actuatable for controlling said electric circuit means;

a teaching card assembly sized to horizontally run in the upright guide slot of said body in the forward and backward directions, when urged by the first-named pressure means into contact with said capstan means and driven thereby, said teaching card assembly comprising:

a first sheet having a key visual information; and a second sheet having an additional visual information, at least one of the first- and second-named sheets being made of a transparent material so that the key and additional informations may be observed as a visual information of a suspended meaning when the two sheets are placed one on the other, the second-named sheet having at least one magnetically recording horizontal medium, in which at least one question concerning the superposed visual information and also at least one answer corresponding to the question are recorded as an audio information, said second-named sheet having a plurality of image slides concerning the superposed visual information for a projecting purpose.

* * * * *